United States Patent [19]
Movshovich

[11] Patent Number: 5,386,251
[45] Date of Patent: Jan. 31, 1995

[54] TELEVISION RECEIVER WITH LEARNING REMOTE CONTROL SYSTEM CAPABLE OF BEING CONTROLLED BY A REMOTE CONTROL DEVICE MANUFACTURED BY DIFFERENT COMPANIES

[75] Inventor: Aleksandr Movshovich, Santa Clara, Calif.

[73] Assignee: Zilog, Inc., Campbell, Calif.

[21] Appl. No.: 72,180

[22] Filed: Jun. 3, 1993

[51] Int. Cl.⁶ ............................................. H04N 5/44
[52] U.S. Cl. ........................... 348/734; 340/825.69; 340/825.72; 455/151.2; 455/352
[58] Field of Search ................. 358/194.1, 188; 455/151.1, 151.4, 151.2, 352, 353; H04N 9/00, 5/00, 5/44; 348/734, 725; 340/825.69, 825.72

[56] References Cited

U.S. PATENT DOCUMENTS

| | | | |
|---|---|---|---|
| 4,905,279 | 2/1990 | Nishio | 358/194.1 |
| 4,994,622 | 3/1991 | Amaro et al. | 358/194.1 |
| 5,081,534 | 1/1992 | Geiger et al. | 348/734 |
| 5,086,298 | 2/1992 | Katsu et al. | 348/734 |

FOREIGN PATENT DOCUMENTS

| | | | |
|---|---|---|---|
| 0014576 | 1/1988 | Japan | H04N 5/00 |
| 4083474 | 3/1992 | Japan | H04N 5/00 |

*Primary Examiner*—James J. Groody
*Assistant Examiner*—Michael H. Lee
*Attorney, Agent, or Firm*—Majestic, Parsons, Siebert & Hsue

[57] ABSTRACT

A learning TV is disclosed which enables the TV to learn and be remotely controlled by remote control signals generated from any remote control device produced by any manufacturer. The user is able to assign to each received remote control signal a particular function such as POWER ON/OFF, performed by the learning TV. To facilitate the user in programming the television during the learning mode, directions are provided to the user on the television screen instructing the user of the various steps required to properly program the television to learn the remote control codes and how to assign these codes to a particular executable routine of the learning TV.

10 Claims, 7 Drawing Sheets

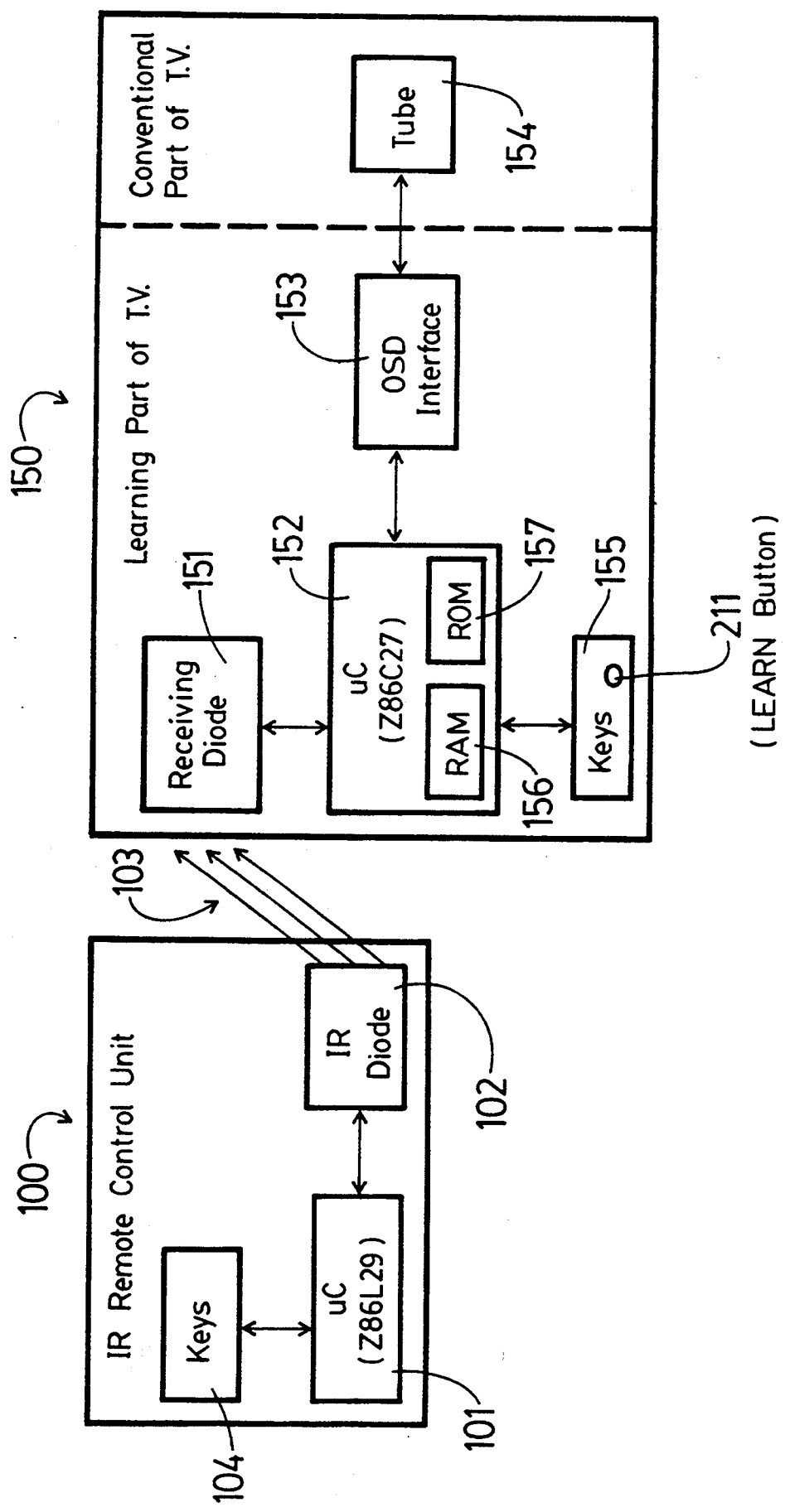
FIG._1.

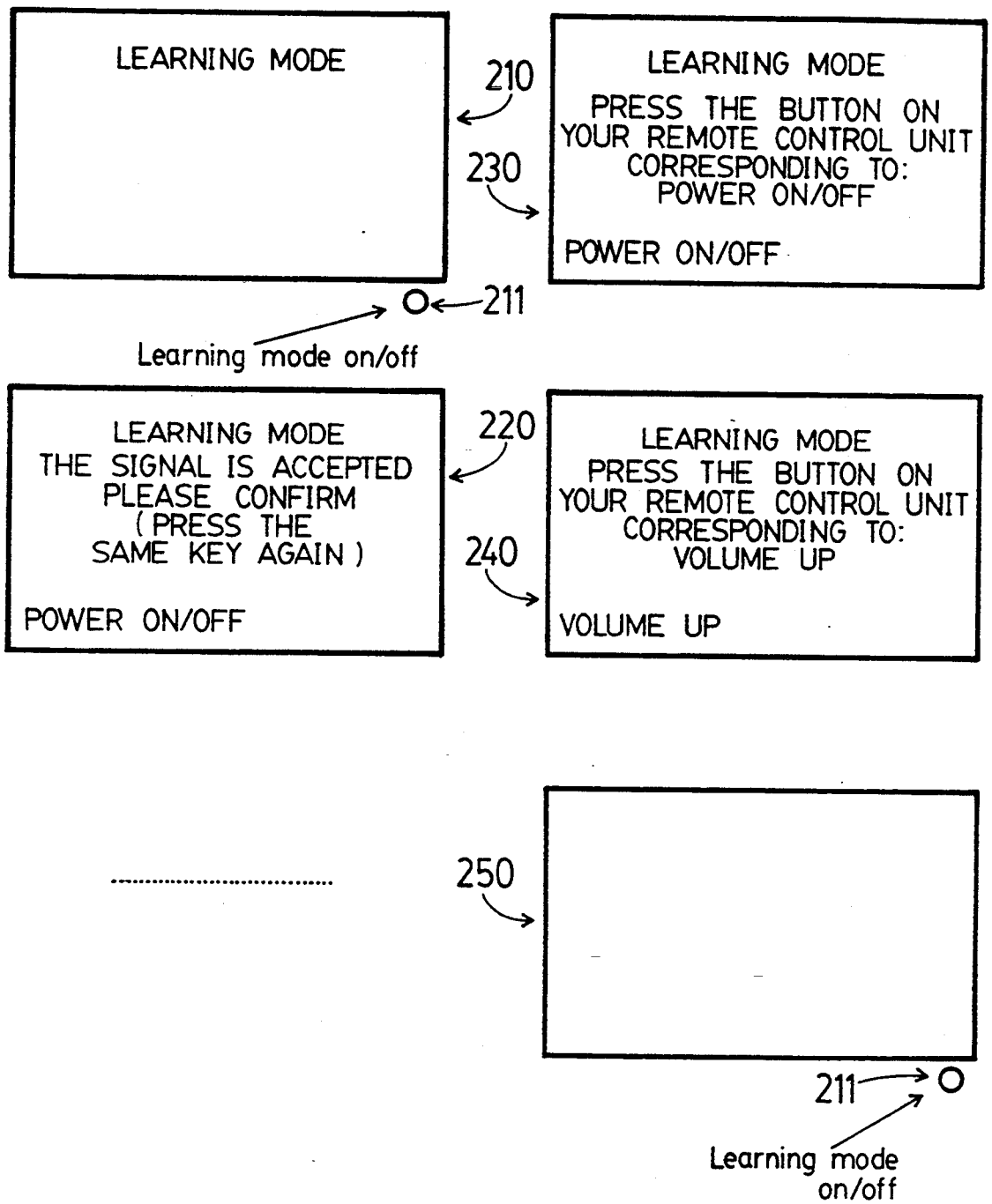
FIG._2.

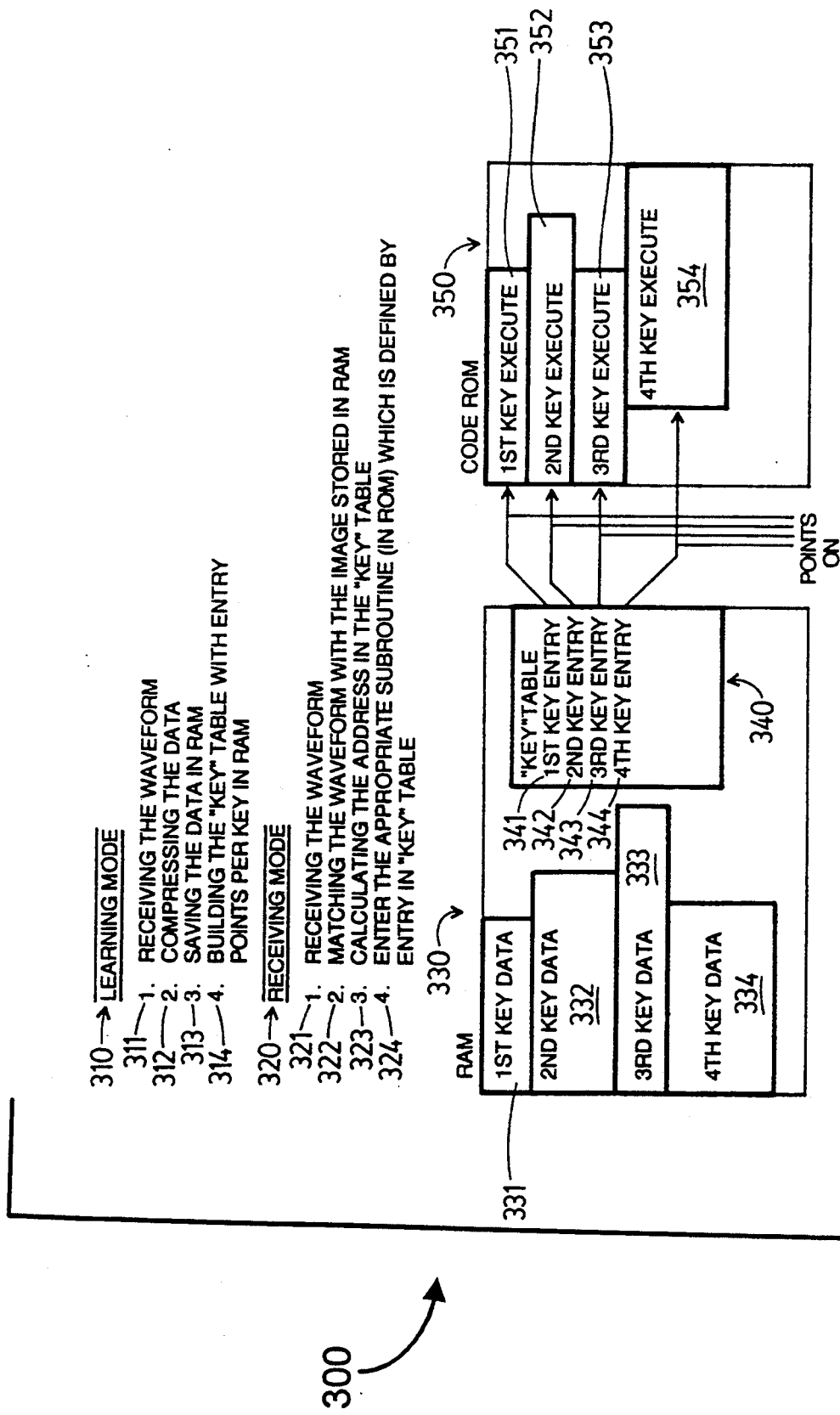
FIG._3.

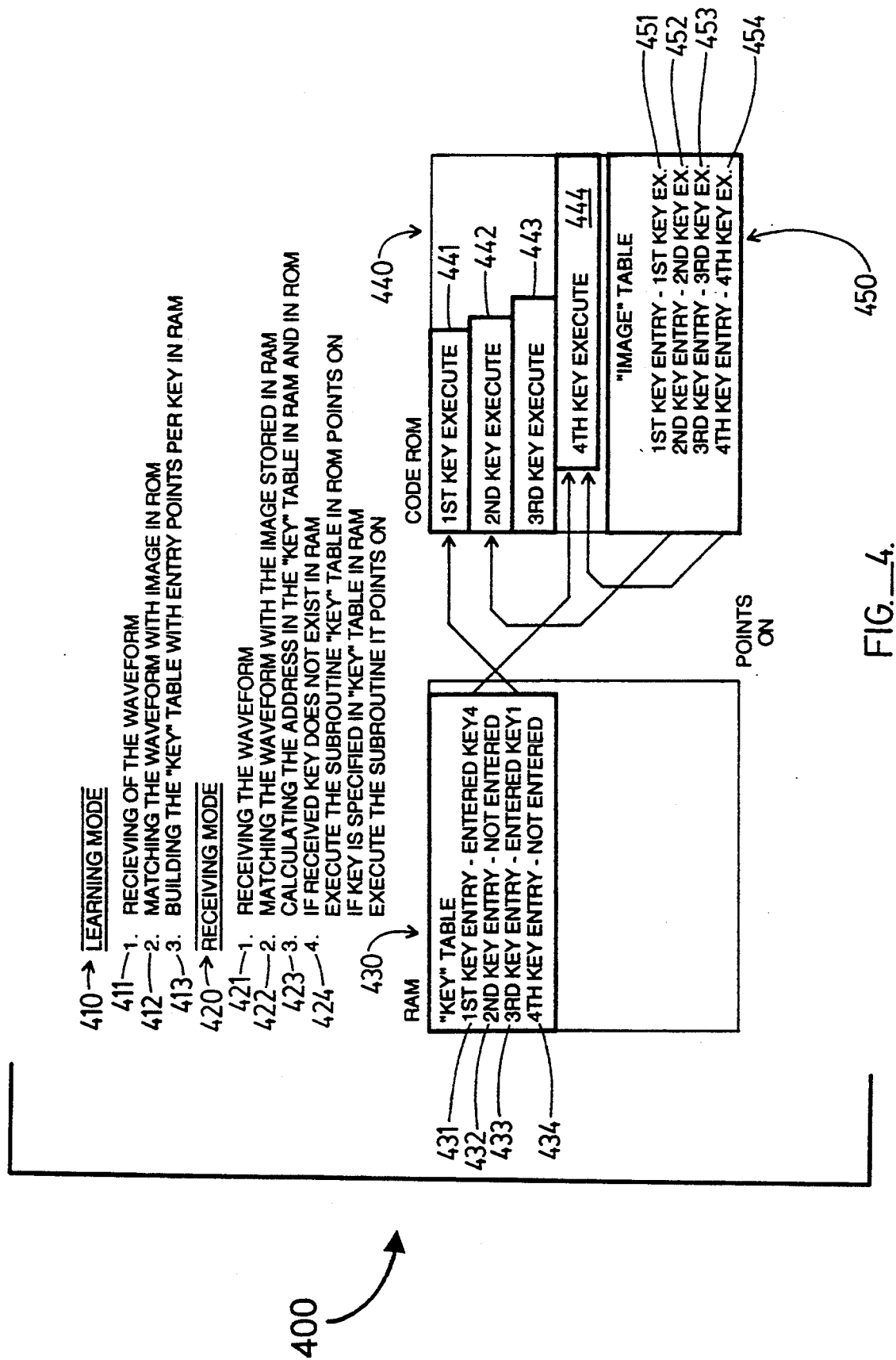
FIG._4.

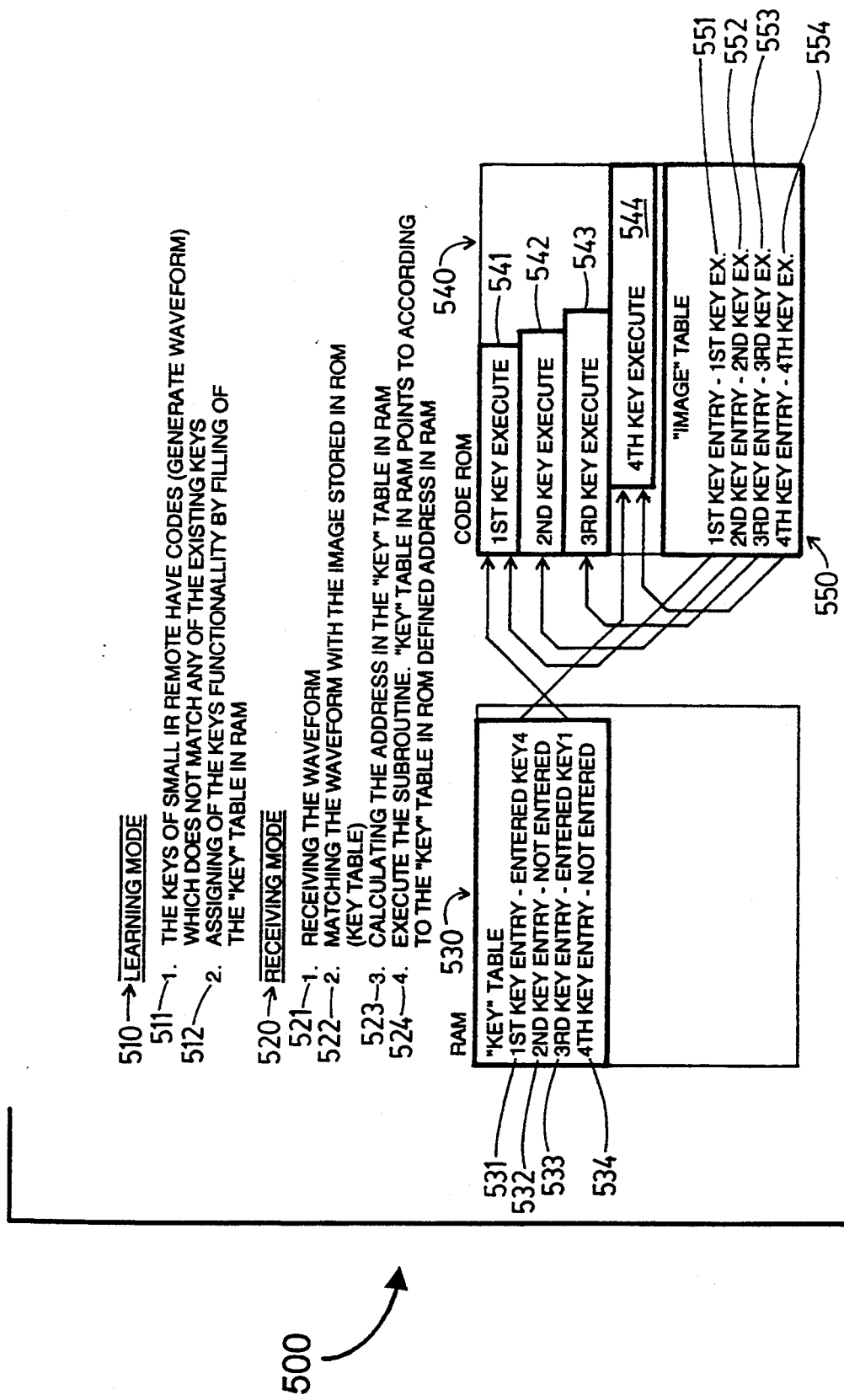
FIG._5.

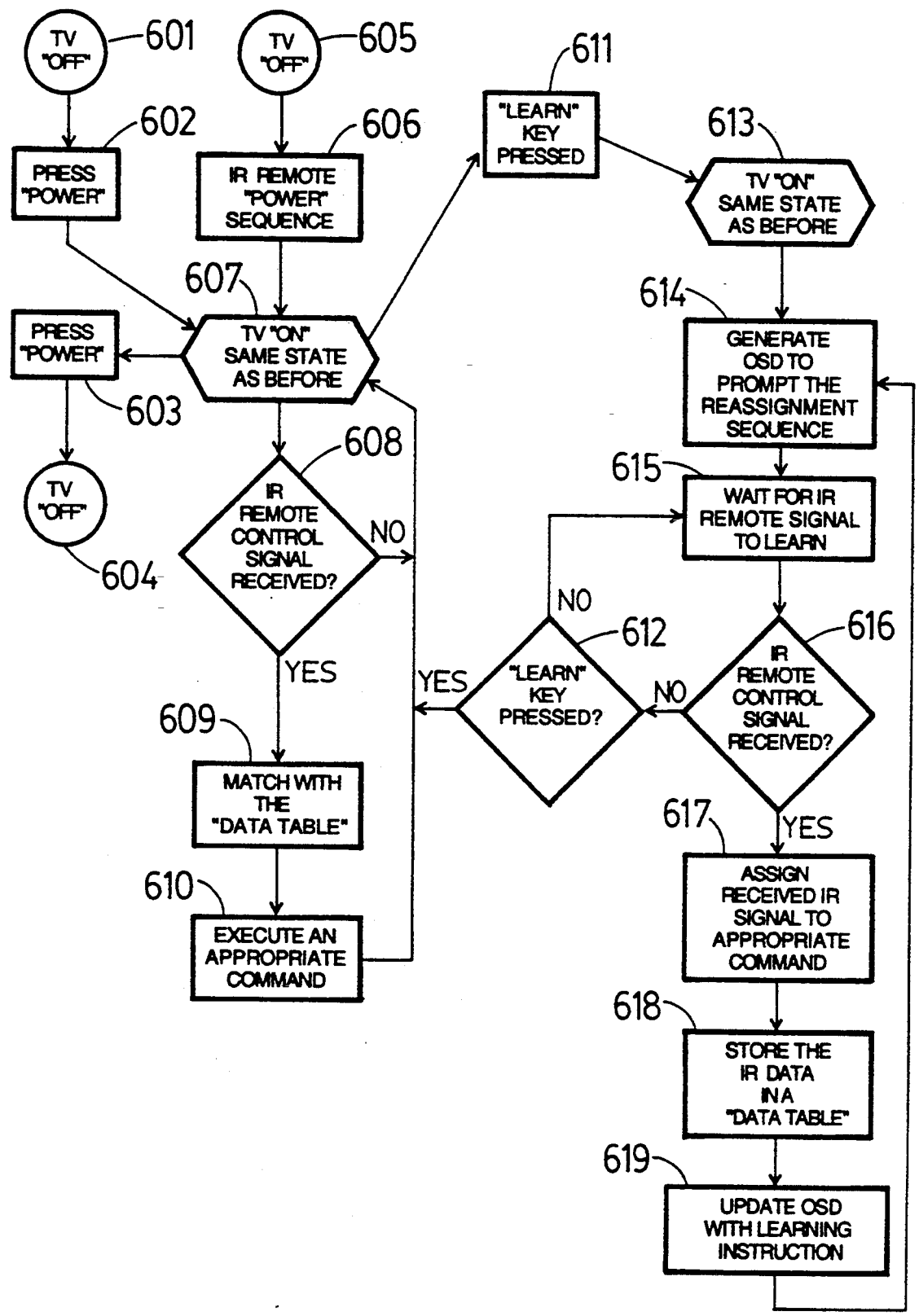
FIG._6.

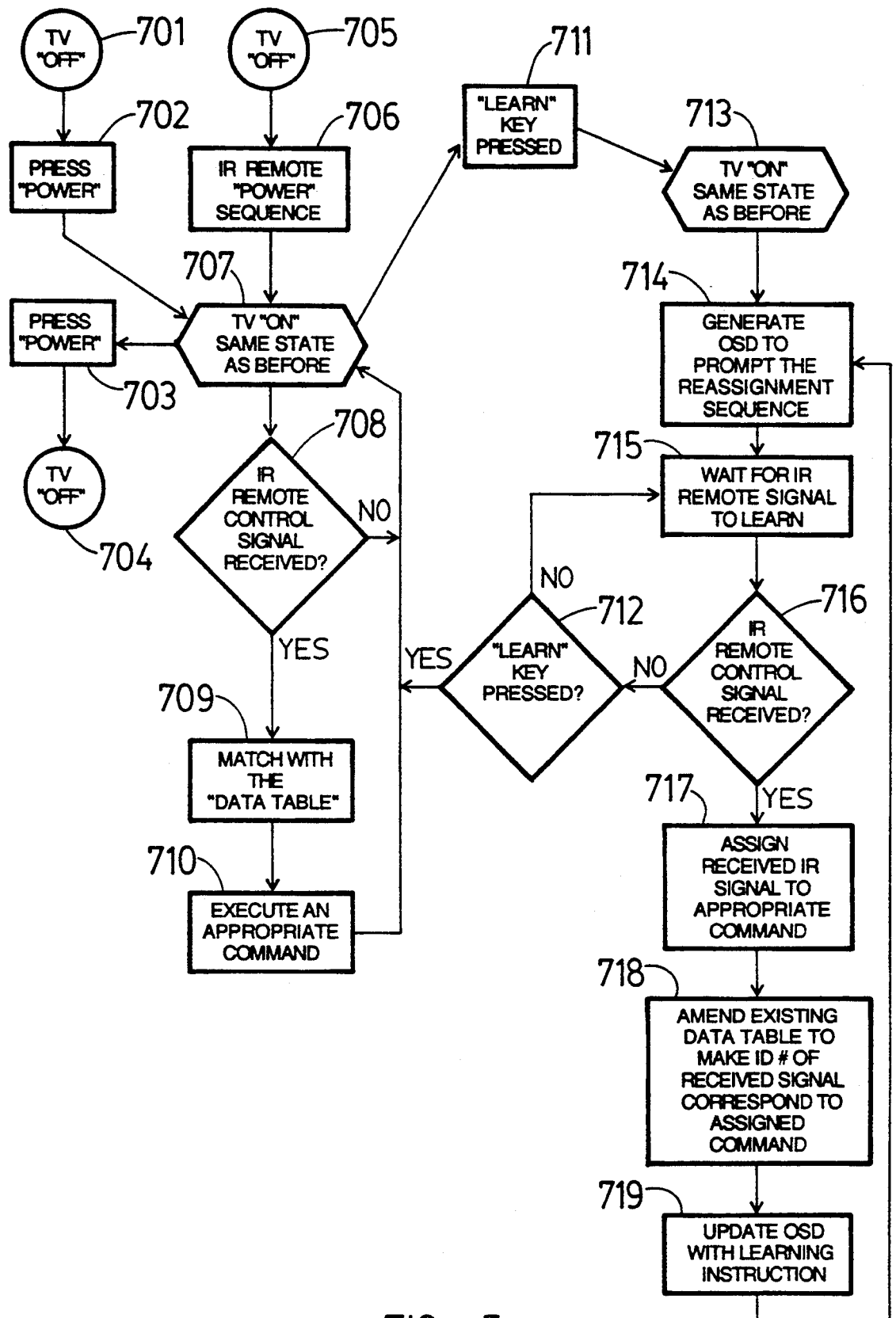
FIG._7

TELEVISION RECEIVER WITH LEARNING REMOTE CONTROL SYSTEM CAPABLE OF BEING CONTROLLED BY A REMOTE CONTROL DEVICE MANUFACTURED BY DIFFERENT COMPANIES

FIELD OF THE INVENTION

This invention relates generally to remote control television systems, and more particularly to a television receiver with a remote control system capable of being controlled by remote control devices manufactured by different companies.

BACKGROUND OF THE INVENTION

It is a well known convention to provide audio and/or video electronic apparatus, such as television receivers and video tape recorders, with respective remote control transmitters that are separate and apart from the actual apparatus and can be manipulated by the user for emitting infrared or other signals by which the respective television receiver or video tape recorder may have its operations remotely controlled. In general, the various manufacturers of the electronic devices mentioned above each employ different remote control codes for remotely controlling the respective electronic device which they manufacturer.

As used in this description and in the appended claims, the words "remote control translator," "remote control device," "remote controller," "remote", and "remote control" all refer to a device with can remotely control the various functions of an electronic device such as a TV, VCR, laser disc player or other audio visual device.

Previously, a remote control transmitter that was provided with an electronic device, such as a TV or VCR, would only be able to remotely control that particular electronic device. More modernly, however, remote control transmitters that are provided with a particular electronic device have been designed to remotely control not only that particular electronic device, but also other peripheral devices produced by the same manufacturer. For example, a remote controller supplied with a TV manufactured by Company A very often is designed to remotely control not only the TV, but also a VCR manufactured by Company A. However, because each manufacturer uses different remote control codes to remotely control their respective electronic devices, the remote controller manufactured by Company A in the example above would not be able to remotely control a VCR manufactured by Company B. This is because the VCR manufactured by Company B uses a different control code than the VCR manufactured by Company A.

One problem associated with the manufacturers remote control transmitter is that they are often very complex and may be difficult for the user to operate. Often the keys corresponding to desirable remote control functions such as VOLUME UP/DOWN or CHANNEL UP/DOWN are not laid out conveniently for the user and are difficult to locate. Unfortunately, the user in possession of a poorly designed manufacturer's remote control device can do nothing to alter the layout of the keys, and must therefore learn to adapt to the layout as designed by the manufacturer.

In recent years, some manufacturers have become aware of the problems associated with a complex remote control device. To resolve this problem, a number of manufacturers now include two remote control devices for remotely controlling a particular electronic device, such as a TV or VCR, purchased by a consumer. The first remote control device is the standard complex remote controller discussed above. The other remote control device is smaller in size and less complicated, containing only a limited number of keys to correspond to the essential functions of the electronic device such as POWER ON/OFF, VOLUME UP/DOWN, and CHANNEL UP/DOWN. The small remote control device is easier to operate by the user since it has a limited number of keys (about 4 or 5) to remotely control a limited number of functions of the electronic device. The problem with this small remote control, however, is that its usefulness is limited only to those functions of the electronic device which it can remotely control. Thus, for example, a user wishing to control the functions of brightness and CHANNEL UP/DOWN of a television would not be able to use the small remote control device described above because that device is not able to remotely control the brightness function. Instead, the user is forced again to resort to the larger, more complicated remote controller.

In response to the limitations discussed above, a new line of remote control transmitters have been developed which are called "learning" remote controller and "universal" remote controller. Each of these two types of remote controllers operates by a different principle, and each has its own set of limitations. The "universal" remote controller is preprogrammed with all the remote codes of the various major manufacturers of electronic devices. These remote control codes are typically stored in some sort of ROM within the remote control device. To use this "universal" remote controller, the user initially inputs into the remote controller a code which represents the manufacturer of that specific electronic device to be controlled. Once the universal remote controller has been initialized, it is then able to remotely control a number of independent electronic devices each produced by a different manufacturer. For example, the user owns a television manufactured by Company A and a VCR manufactured by Company B. Using the universal remote controller, the user is then able to remotely control the television by entering in, via the key pad of the remote controller, a code which represents electronic devices manufactured by Company A. Once initialized in this manner, the universal remote controller produces remote control signals which are equivalent in format to those remote control signals produced by remote controllers manufactured by Company A. When the user subsequently desires to control the VCR manufactured by Company B, he enters the code corresponding to Company B into the universal remote controller, whereupon the universal remote controller functions as a remote controller manufactured by Company B, thus enabling the user the remotely control the VCR.

One problem associated with the universal remote controller is that it only contains a finite number of codes representing a finite number of manufacturers. If a user owns an electronic device not within the list of those manufacturers, the user is out of luck and the universal remote controller cannot be initialized to remotely control that particular electronic device.

The other type of remote control device able to remotely control a number of electronic devices each produced by a different manufacturer is the "learning"

remote controller. The learning remote controller operates on a different principle than that of the universal remote controller in that the learning remote controller is able to be programmed to "learn" a number of control signals from remote control devices produced by different manufacturers. Once the learning remote controller has been programmed in this manner, it is then able to remotely control a number of electronic devices each produced by a different manufacturer by reproducing the various control signals it has "learned". For example, user owns a TV manufactured by Company A and a VCR manufactured by Company B. Each electronic device comes with its own remote manufactured by that respective company. To use the learning remote controller, the user must first program the learning remote controller to learn the various remote control signals of the remote control devices manufactured by companies A and B respectively. To accomplish this, the learning remote controller is placed into a learning mode and physically placed close to one of the remote control devices manufactured by companies A or B such that a control signal from the manufacturer's remote can be detected by the receiving diodes of the learning remote controller. Various keys on the manufacturers remote are then depressed sending a signal to the learning remote controller. This signal, being received by the learning remote controller, is assigned to a particular key on the learning remote controller keypad and stored in a compressed format within the memory of the learning remote controller. This process is then repeated using the remote control device from the other manufacturer (Company B). After the programming of the learning remote controller has been accomplished, the learning remote controller is then placed into a user mode and is used as an ordinary remote control device to remotely control both the TV and the VCR.

The learning remote control device, however, is not without its problems. One such problem is that the learning remote controller has a limited memory capacity, and therefore can only "learn" a finite number (about 40) remote control signals. Another limitation is that an unprogrammed learning remote controller is useless without the original manufacturers remote control to program the learning remote controller. Therefore, if the manufacturers remote control device for the TV is lost, the learning remote controller cannot be used to remotely control the TV. In addition, the learning remote controller is difficult to program since there is very little feedback information to the user. Lastly, typical learning remote controllers can be very expensive.

It is therefore an objective of the present invention to overcome the various problems and limitations of remote control transmitters herein described above.

SUMMARY OF THE INVENTION

This and additional objectives are accomplished by the various aspects of the present invention, wherein, briefly, according to a principal aspect, a conventional electronic device, such as a TV or VCR, is modified to include additional hardware and software which enables the electronic device to learn and be remotely controlled by remote control signals generated from any remote control device produced by any manufacturer.

According to one aspect of the invention, a true learning TV is disclosed which is able to receive and learn remote control signals generated from any remote control device. The user is able to assign to each received remote control signal a particular function such as POWER ON/OFF, performed by the learning TV. The various functions performed by the TV are referred to herein as "executable routines." To facilitate the user in programming the television during the learning mode, directions are provided to the user on the television screen instructing the user of the various steps required to properly program the television to learn the remote control codes and how to assign these codes to a particular executable routine of the learning TV. Once an executable routine has been assigned to a particular received control signal, a representation of that control signal, typically in a compressed format, is stored within the memory of the learning device. Upon completion of the learning procedure, a learning mode is disabled and the TV again resumes its normal mode. The learning TV is then able to be remotely controlled by the remote control signals generated from the remote control device. Thus, when the learning TV subsequently receives a remote control signal, the waveform of that signal is compared and matched to the images stored within the memory of the learning device. Once a match has been found, the corresponding executable routine assigned to that particular remote control signal is executed by the learning device.

Another aspect of the present invention is directed to a learning TV which is capable of reassigning the keys of the remote control device to remotely control the various operations of the learning TV. This feature is particularly useful to users who are dissatisfied with the conventional layout of the manufacturers remote control, and is also useful to users who desire to use a remote control device from the same manufacturer as the TV, but which was not designed to operate that particular television model. In order to utilize the features of this type of learning TV, the user must first place the television into its learning mode, whereupon directions will be displayed on the television screen instructing the user on how to reassign the keys of the remote control device to correspond to the various functions of the television. Once this modification of key assignments has been made, the TV is returned to its normal mode of operation, and the user is able to then remotely control the learning TV using the modification of key assignments which he has chosen.

Yet another aspect of the invention is directed to a learning TV which comes equipped with both a large remote control device comprising many keys, each of which controls a corresponding function in the learning TV and a small remote control device comprising only a few keys, each of which has not been assigned to control any function of the learning TV, or has been pre-assigned to control a limited number of functions of the learning TV. In this aspect of the invention, each of the previously unassigned or pre-assigned keys of the small remote controller is able to be assigned or reassigned respectively to control a particular function of the learning TV which is determined by the user. The procedure for assigning operational functions of the learning TV to the small remote controller is similar to that of the procedure described above for modifying the key assignments of a remote control device manufactured by the same company as that of the learning TV. The advantage of this aspect of the invention is that the keys of a small remote controller used in conjunction with the learning TV can be assigned by the user to remotely control a limited number of operational functions of the learning TV which the user deems to be essential. Unlike the conventional television wherein the small remote controller is only able to remotely control and predetermined number of functions of the TV, a small remote control used in conjunction with the learning TV is able to remotely control the functions of the learning TV determined by the user.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 is a schematic block diagram illustrating the essential components of an electronic system according to an embodiment of the present invention;

FIG. 2 is an illustration of the programming instructions which are displayed to a user on the television screen;

FIG. 3 is an example of the operation of one particular embodiment of the present invention which is referred to as a true-learning TV;

FIG. 4 is an example of the operation of a second specific embodiment of the present invention, which is referred to as a TV with modification of key assignments;

FIG. 5 is an example of the operation of a third specific embodiment of the present invention, which is referred to as a small remote control TV;

FIG. 6 is a flow diagram which illustrates the operation of the true learning TV embodiment of the present invention as depicted in FIG. 3; and FIG. 7 is a flow diagram illustrating the operation of the embodiment of the present invention as depicted in FIGS. 4 and 5.

DETAILED DESCRIPTION OF THE PREFERRED EMBODIMENT

FIG. 1 is a block diagram depicting the essential elements necessary to implement a first preferred embodiment of the present invention. In FIG. 1, a remote control unit 100 is shown transmitting a remote control signal 103 to a television set 150. In the embodiment shown in FIG. 1, the remote control signal 103 is shown to be an infrared signal, and is generated from an infrared diode 102. Most conventional remote control devices utilize infrared signals to remotely control televisions sets or other electronic apparatuses. It should be understood, however, that the embodiment depicted in FIG. 1 can be adapted to work with other remote control signals such as ultrasonic or ultraviolet signals.

The use of an IR remote control unit 100 to remotely control a television set 150 is commonly known to those skilled in the art, and therefore need not be discussed in greater detail in the present application. However, for purposes of clarification, the elements depicted in FIG. 1 will now be described. The IR remote control unit 100 is shown to include three essential elements, namely, keys 104 which are depressed by the user, a microcontroller 101 which determines the particular control signal to be generated based upon the key to press by the user, and an IR diode 102 which generates the control signal determined by the microcontroller. The signal 103 generated from the remote control unit 100 is then received by a receiving diode 151 located within the television set 150. How the remote control signal 103 gets processed depends upon whether the TV set 150 is in a "learning" mode or a "normal" mode. If the TV set is in a "normal" mode, the remote control signal functions to remotely control a particular operation of the TV set, meaning that the remote control unit and the television set operate in a conventional fashion. If, however, the TV set is in a "learning" mode, which is caused by the depression of the LEARN button 211, then the received remote control signal 103 is processed by additional software within the microcontroller 152 (included as part of the present invention) and assigned within the RAM 156 to a particular executable routine or operation of the television set 150 such as POWER ON/OFF, said executable routines being located within the ROM 157. In this mode of operation, the microcontroller 152 instructs the OSD interface 153 to generate a video signal on the television tube 154. This video signal, which is depicted in FIG. 2, instructs the user on how to program the learning function of the TV.

Referring to FIG. 2, a user is able to activate or deactivate the learning mode by depressing the learning mode ON/OFF button 211. When the learning mode is activated, the instructional language appears on the television screen, instructing the user on how to properly program the learning TV. The language which appears on the TV screen in FIG. 2 is generated by the OSD interface 153 (FIG. 1) and controlled by the new software within the microprocessor 152 (FIG. 1). As depicted in item 230 of FIG. 2, the user is instructed to depress a button on the remote control unit corresponding to a particular executable routine or function of the learning television. Although it is not shown in FIG. 2, it is understood that the user has the ability to scroll through a list of the functions performed by the TV until the user identifies a particular function which he wants to assign to a particular key on the remote control unit. In FIG. 2 the user has chosen in item 230 to assign the POWER ON/OFF function of the TV to a particular key on the remote control unit. When the user depresses the key on the remote control unit, thereby transmitting a remote control signal 103 to the receiving diode 151, the signal is identified by the microcontroller 152 and assigned to the particular function (POWER ON/OFF) determined by the user. In one embodiment of the present invention, as depicted in item 220 of FIG. 2, the learning TV indicates to the user that the signal has been accepted and requests the user to confirm the signal by depressing the same key on the remote control unit again. After confirmation of this signal, the user may then proceed to assign other functions of the TV to be remotely controlled by the remote control unit. After the user has completed all his desired programming, he then depresses the learning mode ON/OFF button 211, thereby disabling the learning mode and returning the learning TV to its normal operational mode.

FIG. 3 depicts a first preferred embodiment of the present invention referred to as a "true learning TV." In this embodiment, any remote control unit can be used to remotely control the various functions of the learning TV. The remote control signal generated by the remote control unit is "learned," and a representation of the signal (usually in compressed form) is stored within the RAM 330 of the microcontroller 152 (FIG. 1). The basic steps which are performed by the learning TV in learning the remote control signal are depicted in FIG. 3 as items 311-314. While in the learning mode, a particular remote control signal is received by the learning TV. The characteristics relating to the waveform of the signal are converted to data and are then compressed. This compressed data is then stored within the RAM 330 of the learning TV. The individual waveform data is depicted in FIG. 3 as items 331-334. Once the data for a particular signal 331 is stored within the memory 330, it is then assigned, according to the procedure depicted in FIG. 2, to a particular executable routine 351 located within the ROM 350 of the learning TV. The key data 331-334 is assigned to correspond to executable routines 351-354 respectively by building a "key" table with entry points corresponding to each key data contained within the RAM which point on the starting the address of the particular executable routine assigned to that key. For example, the first key data 331 located within the RAM 330 contains a compressed waveform generated from the remote control unit. Corresponding to this first key data 331 is a first key entry 341 within the key table 340. For every key data located within the RAM 330 there is a corresponding key entry located within the key table 340. The data contained within the first key entry 341 of the key table 340 is the starting address or similar identifying feature which points on the particular executable routine 351 assigned to the remote control signal of the first key data 331. For illustrative purposes, this executable routine 351 could be the POWER ON/OFF feature of the TV.

Once a particular executable routine has been assigned to the first key data, the learning process continues with a second remote control signal being received and compressed into a second key data 332, wherein another executable routine, such as item 352, is then assigned to the second key data 332, resulting in the second entry 342 of the key table 340 pointing on the assigned executable routine 352. After all the required learning has been completed, the RAM 330 will contain all the information necessary to identify a particular received controlled signal and determine which function of the learning TV to execute based upon the data located within the key table 340.

Items 321-324 of FIG. 3 describe the basic steps necessary to remotely control the learning TV once it has been properly programmed. First, a particular waveform is received by the receiving diode 151 (FIG. 1) of the learning TV. This waveform is then matched with the data representing the various waveforms stored within the RAM 330. Once a match has been found, for example the received waveform matches the characteristics of the first key data 331, the address of the particular executable routine assigned to that signal is determined according to the information contained within the first key entry 341 of the key table 340. In this case the assigned executable routine is item 351. The microcontroller 152 (FIG. 1) then executes the assigned executable routing or subroutine 351 contained within the ROM 350.

A more simplified depiction of the operation of the true learning TV embodiment is illustrated in the flowchart of FIG. 6. Referring to FIG. 6, it is assumed that the learning TV is originally in the off position. The TV may then be turned on either by pressing the POWER button of the television or by remotely transmitting a "POWER ON" signal to the television. Once the TV is on, it then functions in its normal mode represented by steps 607-610, or, if the "LEARN" key is pressed (step 611), the TV enters the learning mode represented by steps 613-619. While in the learning mode, the TV generates an on screen display to prompt the learning sequence from the user. The learning TV then waits for an IR remote signal to be received and learned by the learning TV. Once an IR remote control signal has been received, it is assigned to an appropriate executable routine of the television, and the IR data representing the characteristics of the received waveform is stored in the data table. The on screen display is then updated with new learning instructions, and the learning sequence is returned to step 614.

If the "learn" key is pressed at any time during the learn mode (step 612), the TV resumes its normal mode of operation depicted as state 607. While in its normal mode of operation, the learning TV waits to receive an IR remote control signal. Once that signal is received, it is compared with the signals in the data table until a match is found. Once a match has been found, the appropriate executable routine assigned to that signal will then be executed, and the learning TV returns to its previous state depicted as state 607.

FIG. 4 is an illustration of a second preferred embodiment of the present invention, referred to as a learning TV with modification of key assignments. This second preferred embodiment differs from that of the first in that only remote control devices produced by the same manufacturer as that of the learning TV can be used to remotely control the learning TV. Rather than storing the data characteristics of the actual signal produced by the remote control unit, the second preferred embodiment allows the user to reassign the various keys of the remote control unit to control the desired functions of the learning TV. Therefore, according to the second embodiment and a third embodiment (discussed below), there must already exist within the ROM 440 of the learning TV 400 a predefined "image" table 450 comprising a list of all identifiable signals which can be generated from the remote control unit produced by that manufacturer.

When a conventional TV receives a remote control signal, that signal is matched to the image within the table within the TVs ROM, and the appropriate subroutine or function of the TV is then executed. The learning TV 400 in FIG. 4, however, is able to reassign the television function associated with each remote control signal by building a new "key" table 430 within the RAM of the learning TV.

The method of modifying the key assignment of the learning TV 400 is outlined in steps 411-413 of FIG. 4. While in the learning mode, a specific control signal is received by the learning TV. The waveform of this signal is matched with the image of the waveform located within the table 450 of the ROM. For example, suppose the user wants to reassign a certain key on the remote control unit to perform the POWER ON/OFF function of the TV. Following the steps discussed above in FIG. 2, the user places the learning TV in a learned mode, and scrolls through the various key assignments displayed on the television screen until the POWER ON/OFF function is chosen. The user then presses the desired key on the remote control unit for which he wishes to assign the POWER ON/OFF function. Let us assume that the POWER ON/OFF signal produced by the remote control unit is identified as the fourth key entry 454 within the ROM table 540, and that the new signal which the user desires to control the POWER ON/OFF function corresponds to the first key entry 451 of ROM table 450. Without any modification of key assignments, when the signal corresponding to the first key entry 451 is produced by the remote control unit, the TV will then execute the first key executable routine 441. Similarly, when the remote control unit produces a signal whose waveform corresponds to entry 454 of the ROM table, the fourth key executable routine 444 (POWER ON/OFF) would be executed. In order to reassign the key of the remote control unit corresponding to the first key entry 451 to remotely control the POWER ON/OFF function 444, a table is built within the RAM 430 identifying the waveform of the first key entry, and reassigning to this key entry the executable routine of the fourth key 444 (POWER ON/OFF). This entry in the RAM table 430 is identified in this example as item number 431.

When the learning TV 400 is then placed back into its normal mode of operation, two buttons on the remote control unit will each be able to remotely control the POWER ON/OFF function performed by the TV. When the button corresponding to the first key entry is pressed, the waveform is received by the learning TV and matched to the waveform of the images stored within the RAM table 430. The match will identify the signal as corresponding to item 431 within the key table 430, and seeing that this key has been reassigned, the TV will then execute the reassigned function which, in this case, corresponds to the fourth key executable routine 444 (POWER ON/OFF). The other button which can remotely control the POWER ON/OFF function of the TV is the button corresponding to the fourth key entry 434 within the RAM 430. When this button is pressed, the remote signal is identified by the television as corresponding to the fourth key entry, and since there is no reassignment of this key, the television then executes the subroutine originally programmed by the manufacturer in the ROM table 450, which in this case is the fourth key executable routine 444 (POWER ON/OFF).

FIG. 5 is a third preferred embodiment of the present invention, whose operation is very similar to that of the embodiment depicted in FIG. 4. In the embodiment depicted in FIG. 5, referred to as a small remote control TV, two remote control devices, both produced by the same manufacturer as that of the TV, are provided for use to remotely control the various functions of the TV. The first remote is similar to that of most conventional remotes in that it comprises many keys to remotely control the various functions of the TV. The second remote is smaller and less complicated and comprises, for example, only four keys to control only a limited number of function of the TV. According to this third embodiment, the user is able to assign to the four keys of this second remote the essential functions which the user deems appropriate, such as POWER ON/OFF and CHANNEL UP/DOWN. As with FIG. 4, the embodiment depicted in FIG. 5 also includes a RAM table 530. However, this table is limited in the number of entries it contains to the number of keys contained within the second remote control device. Initially, none of the keys of the second control device correspond to any of the functions performed by the TV. However, it is understood that in another and different embodiment, each of the keys of the second remote control device are initially pre-assigned to control a limited number of function of the TV determined by the manufacturer, such as POWER ON/OFF and CHANNEL UP/DOWN. The essential feature of either embodiment is that each of the signals produced by the second remote control device are separate and distinct from each of the signals produced by the first remote control device; there is no overlap of signals.

In order to assign specific functions of the TV to the individual keys of the second remote control device, the same procedure is implemented as that discussed above in FIG. 4. As illustrated in the example of FIG. 5, the signal corresponding to the first key of the second remote control device 531 has assigned to it the executable routine 544 of the fourth key of the first remote control device. Assuming that this executable routine corresponds to POWER ON/OFF, when the first key of the second remote control device is depressed, it results in turning the power of the TV on or off. Likewise, the fourth key of the first remote control device performs the same function. The signal corresponding to the second key entry 532 of RAM table 530 has not been assigned to any function. Therefore, when this key on the second remote control device is depressed, there will be no effect upon the TV since the signal has not yet been defined to have any meaning.

The operation of the second and third embodiments of the present invention are depicted in the flow chart of FIG. 7. In FIG. 7, it is assumed that the learning TV initially is in its off state. The TV can be turned on by either pressing the POWER button on the TV directly or by remotely transmitting a "POWER ON" signal to the TV. Once the learning TV is turned on, it assumes its normal mode of operation represented by steps 707–710. If the "LEARN" key is pressed (step 711), the TV enters into the learning mode, represented by steps 713–719, and the on screen device within the TV generates instructions to prompt the reassignment sequence from the user. The TV then waits for a IR remote signal to learn. When the signal is received, an appropriate command or executable routine of the TV is reassigned to that particular signal. The existing RAM data table identifying the assignments of all the keys is then amended to reflect this new assignment. The on screen device then updates the user with further learning instructions, and the process returns to step 715. If at any time the "LEARN" key is pressed again (step 712), the TV returns to its normal mode of operation as indicated by state 707.

To remotely control the TV, an IR remote control signal is received and matched with a waveform in the RAM data table. The appropriate executable routine assigned to this signal is then determined and executed, and the TV then returns to its previous state 707.

Although several preferred embodiment of this invention have been described in detail herein with reference to the accompanying drawings, it is to be understood that the invention is not limited to these precise embodiments, and that various changes and modifications may be effected therein by one skilled in the art without departing from the scope or spirit of the invention as defined in the appended claims.

It is claimed:

1. A system for operating an electronic device through the use of a remote control device, the operation of the electronic device being implemented via execution of plurality of executable routines stored within the electronic device, the remote control device being capable of generating a plurality of pre-defined remote control signals, the electronic device being pre-programmed by a manufacturer to identify and respond to each of said pre-defined remote control signals, wherein at least one predefined remote control signal has assigned to it a corresponding executable routine, and wherein reception of one of said predefined remote control signals causes the electronic device to execute the corresponding executable routine assigned to the one signal, the electronic device further being capable of generating a video signal for use in conjunction with a video display device, said system comprising:

receiving means in communication with the electronic device and responsive to the plurality of remote control signals generated from the remote control device for receiving said plurality of control signals one at a time;

assigning means for assigning to a received pre-defined remote control signal a different corresponding executable routine than that originally assigned by the manufacturer, and executing means responsive to said assigning means for executing the different corresponding executable routine assigned to said received remote control signal.

2. The system of claim 1 wherein said assigning means comprises:

means for identifying the different corresponding executable routine assigned to said particular received signal, and for identifying said received remote control signal as corresponding to a pre-defined identification code, said identification code being a non-waveform representation of said received remote control signal; and means for storing the identification code corresponding to said received remote control signal and for storing an identity of the different corresponding executable routine which was reassigned to said remote control signal.

3. The system of claim 1 wherein the video display device comprises:

means for displaying an image in response to the video signal, and means for instructing a user on how to operate said system.

4. The system of claim 1 wherein the electronic device and the display device are located within a common structure.

5. The system of claim 1 wherein the electronic device and the display device are located within separate structures.

6. A method for programming the operation of an electronic device, the operation of the electronic device being implemented via execution of plurality of executable routines stored within the electronic device, the electronic device further being pre-programmed by a manufacturer to identify and respond to a plurality of pre-defined remote control signals, each of said pre-defined remote control signals having a corresponding nonwaveform identification code, wherein at least one of the predefined remote control signals has assigned to its identification code a corresponding executable routine, and wherein reception one of said pre-defined remote control signals causes the electronic device to execute the corresponding executable routine assigned to the one signal, the electronic device further being capable of generating a video signal for use in conjunction with a video display device, said method comprising the steps of:

(a) providing within the electronic device a learning device for learning a reassignment of at least one of the plurality of remote control signals generated from a remote control device;

(b) displaying on the video display device programming instructions;

(c) receiving one of the plurality of control signals from the remote control device;

(d) identifying said received remote control signal as corresponding to a pre-defined identification code, said identification code being a non-waveform representation of said received remote control signal;

(d) assigning to said received remote control signal a different corresponding executable routine than that originally assigned by the manufacturer;

(e) storing within the learning device said identification code and an identity of the different corresponding executable routine to which said received signal has been assigned; and (f) repeating steps (b)–(e) until each of all desired executable routines have been assigned to a corresponding received signal.

7. The method of claim 6 wherein said assigning step (d) includes the step of assigning to said identification code said different corresponding executable routine which was reassigned to said received remote control signal.

8. A method for operating an electronic device through the use of a remote control device, the operation of the electronic device being implemented via execution of plurality of executable routines stored within the electronic device, the remote control device being capable of generating a plurality of predefined remote control signals, the electronic device being pre-programmed by a manufacturer to identify and respond to each of said pre-defined remote control signals, wherein at least one predefined remote control signal has assigned to it a corresponding executable routine, and wherein reception of one of said predefined remote control signals causes the electronic device to execute the corresponding executable routine assigned to the one signal, the electronic device further being capable of generating a video signal for use in conjunction with a video display device, said method comprising the steps of:

(a) providing within the electronic device a learning device for learning a reassignment of at least one of the plurality of control signals;

(b) receiving one of the plurality of control signals from the remote control device; and (c) programming said learning device to assign to said received remote control signal a different corresponding executable routine than that originally assigned by the manufacturer.

9. The method of claim 8 wherein said programming step comprises the steps of:

identifying said received remote control signal as corresponding to a pre-defined identification code, said identification code being a non-waveform representation of said received remote control signal;

assigning to said identification code said different corresponding executable routine assigned to said received remote control signal; and storing within the learning device said identification code and an identity of the different corresponding executable routine which was reassigned to said received signal.

10. The method of claim 9, wherein said method further comprising the steps of:

identifying the identification code of said received control signal and the appropriate executable routine which has been assigned to said identification code; and executing said identified executable routine.

* * * * *